(12) United States Patent
Lloyd

(10) Patent No.: US 6,769,778 B1
(45) Date of Patent: Aug. 3, 2004

(54) SLIDE PROJECTOR

(76) Inventor: Gareth Lloyd, 6 Barrington Wood, Lindfield, West Sussex (GB), RM16 2DJ ( * ) Notice: Subject to any disclaimer, the term of this patent is extended or adjusted under 35 U.S.C. 154(b) by 0 days.

(21) Appl. No.: 10/089,792

(22) PCT Filed: Sep. 29, 2000

(86) PCT No.: PCT/GB00/03735
§ 371 (c)(1),
(2), (4) Date: Apr. 1, 2002

(87) PCT Pub. No.: WO01/26077
PCT Pub. Date: Apr. 12, 2001

(30) Foreign Application Priority Data

Oct. 6, 1999 (GB) ............................................. 9923646

(51) Int. Cl.⁷ ............................................. G03B 21/14
(52) U.S. Cl. ...................... 353/103; 353/108; 353/110; 434/285
(58) Field of Search .......................... 353/80, 116, 114, 353/100, 101; 434/285, 286

(56) References Cited

U.S. PATENT DOCUMENTS

| | | | | |
|---|---|---|---|---|
| 3,894,798 A | * | 7/1975 | Wolf | 353/122 |
| 4,756,614 A | * | 7/1988 | Kato et al. | 353/35 |
| 4,858,079 A | * | 8/1989 | Ohashi | 362/35 |
| 4,921,343 A | * | 5/1990 | Ushiro et al. | 353/66 |
| 5,283,601 A | * | 2/1994 | Lowe | 353/62 |

FOREIGN PATENT DOCUMENTS

| | | |
|---|---|---|
| GB | 326457 | 12/1928 |
| GB | 408406 | 12/1932 |
| GB | 356539 | 10/1939 |
| GB | 638493 | 7/1946 |
| GB | 1 485 113 | 6/1973 |

* cited by examiner

Primary Examiner—William C. Dowling
(74) Attorney, Agent, or Firm—Skadden, Arps, Slate, Meagher & Flom, LLP

(57) ABSTRACT

A slide projector that is portable, easy to use and suitable for use by an individual, or individuals in the home. The slide projector comprises means in which to project an image perpendicularly from a slide onto a projection surface. In use, the projected image of the slide lies in a substantially planar surface. The slide is located in a rotating carousel which can be automatically, or manually, rotated, thus providing accurate simulation of the orientation of stars and other celestial bodies at a specific date and time.

16 Claims, 4 Drawing Sheets

SLIDE PROJECTOR

PRIORITY CLAIM

The present application claims priority to international application number PCT/GB00/03735, filed on Sep. 29, 2000, entitled A SLIDE PROJECTOR.

FIELD OF THE INVENTION

The present invention relates to a slide projector, and more specifically to a portable planetarium projector for use in the home.

BACKGROUND

As we move into the next Millennium, there is an increase in the already high interest in the scientific study of astronomy, and also in astrology. Many people visit exhibitions and shows which demonstrate, in simple terms, the movements of stars and other celestial bodies during an hour, day, month or year. Such demonstrations are usually held in large areas and in front of large audiences, due to the complexity and cost of the planetarium required in order to demonstrate the astronomy as accurately as possible.

A planetarium has, by dictionary definition, a projector that projects the positions and movements of stars and planets on to a hemispherical domed ceiling in order to simulate the night sky to an audience seated below. Although this definition stipulates a the presence of a hemispherical domed ceiling, a planetarium, for the purposes of this specification, should be interpreted to include a substantially planar display surface.

Hereto, all mechanical planetarium projectors use spherical or hemispherical surfaces on which a star field representation is held before being projected onto a dome shaped surface. A computer-based planetarium projector is known, which has a star field projected from a flat computer screen, as described for example in UK Patent No. 2,050,775. The software is, however, written for the projection of the star field image onto a domed surface.

The problem with all current planetarium projectors is that purpose-built domed auditoria must be built in order to accurately display the night sky, with the all the celestial bodies in their correct orientations and positions.

Temporary domed structures, such as large inflatable domes, of about 3.5 to 4.5 meters diameter, can be filled with air to demonstrate astronomy, although experts are required to run the demonstration, and the costs can be as large as £10,000. Such planetariums are more suitable for hiring by schools to demonstrate simple astronomy to their pupils.

A children's toy is currently available that comprises a bulb within a transparent ball that may provide some sort of night sky display, when projected on to an outside surface. This is very much limited to being a toy, however, and does not provide an accurate projection for the purposes of studying astronomy.

A conventional planetarium projector comprises a spherical body located around a central light source. The spherical body has an array of pinholes in its surface, through which light is projected from the internal light source. The pinholes do not have any lens assembly. This leads to a projection of dim and fuzzy star, and celestial body, representations.

Furthermore, conventional planetarium projectors require a great deal of skill and training to be operated effectively.

There are currently no accurate planetarium projectors available that are suitable for use by an individual in the home, due to the size, complexity and cost of planetarium projectors, and the requirement for a large domed surface on which to project the star field.

The present invention seeks to alleviate the aforementioned disadvantages by. providing a slide projector that is portable, easy to use, of reasonable cost, and is suitable for use by an individual, or individuals, in the home. In particular, the present invention eliminates the necessity for a domed surface on which to project the night sky in the case of planetarium projector.

SUMMARY OF THE INVENTION

Accordingly, there is provided, a slide projector comprising projection means for directly projecting an image from a slide perpendicularly onto a projection surface, the projection means being such that the projected image of the slide lies, in use, in a substantially planar projection surface, the projection means comprising a light source and at least two vertically juxtaposed slides, parallel to each other.

Preferably, images are projected vertically from the slide onto a substantially planar projection surface and the slides are in the horizontal plane.

In a preferred embodiment, the slide projector comprises two vertically-juxtaposed slides, parallel to one another in the horizontal plane.

Preferably, one of the slides is rotatable while the other slide remains in a fixed position. Alternatively, both slides may be rotatable or both slides may remain in fixed positions.

The slide projector may also have means for retaining the slides in a set position, preferably by providing an air flow above and below the slides. Preferably, the slides are retained due to a sub-atmospheric pressure that is formed below the slides.

Preferably, the slide will display images of astronomy such as starfields and other celestial bodies Preferably still, the fixed slide is one that, in use, displays an image of the sky's horizon. The rotatable slide is preferably one that, in use, displays the image of night sky showing a starfield and/or various other celestial bodies.

BRIEF DESCRIPTION OF THE DRAWINGS

A planetarium projector constructed in accordance with the present invention will now be described in detail, by way of example, with reference to the accompanying drawings, in which.

DETAILED DESCRIPTION

Figure 1:
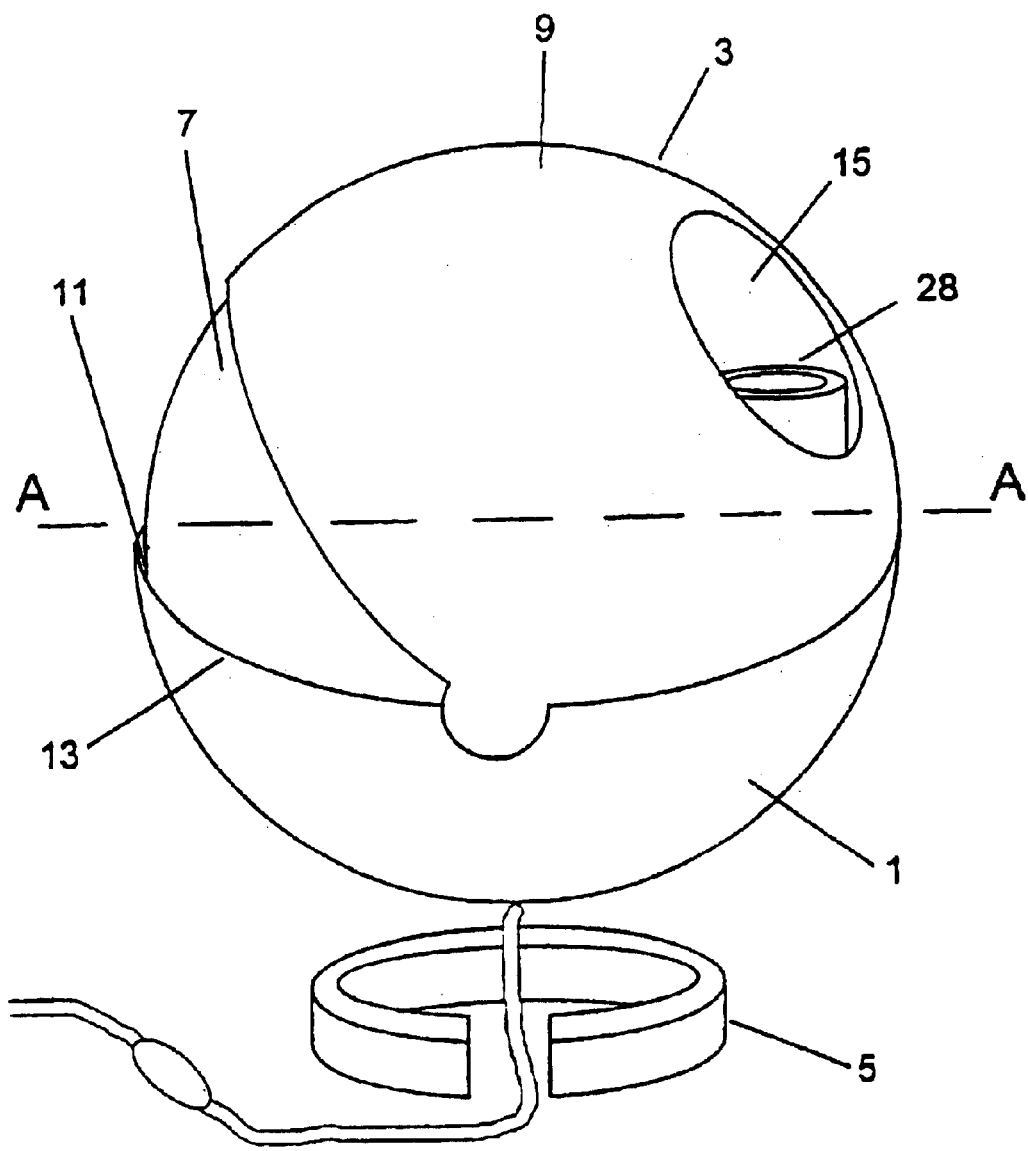
FIG. 1 is a perspective view of the planetarium projector, when in its closed position.

Referring to FIG. 1, the planetarium projector comprises a hollow hemispherical lower portion 1 and a hollow hemispherical upper portion 3. Preferably, the portions are made from plastics material. The lower portion 1 is mounted on a base 5, in the form of a ring, which is able to receive the lower portion, such that the lower portion can be positioned stably thereon and is able to be oriented through a limited angle range. The lower portion 1 may be provided with several indentations with which to receive the upper edge portion of the base 5, to achieve better stability.

The upper portion 3 is formed in first and second hemispherical parts 7 and 9. The first part 7 is fixedly attached to the inner wall of the second part 9, and protrudes downwards therefrom. The upper hemispherical portion 3 is pivotally mounted on the lower portion 1 such that the first part 7 is slidable within the lower portion.

Figure 2:
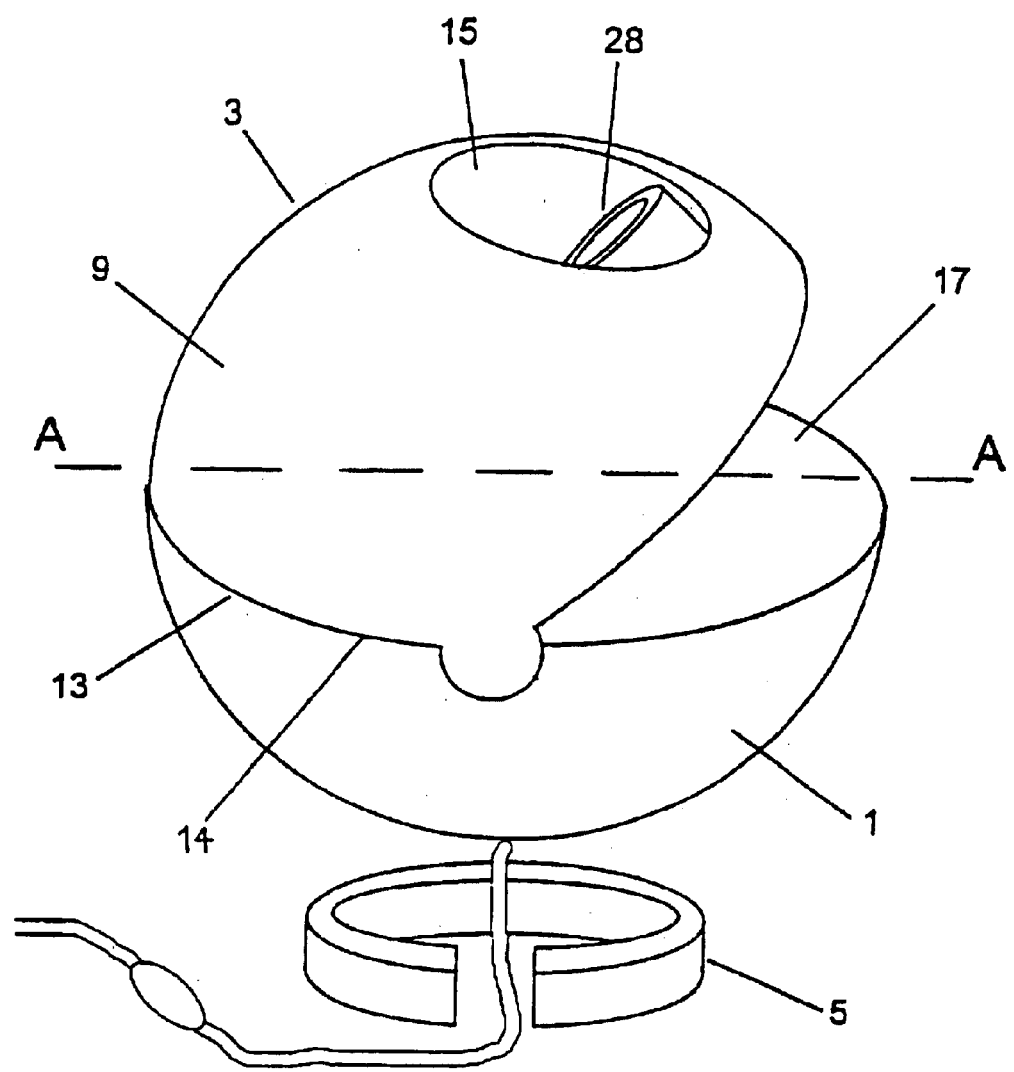
FIG. 2 is a perspective view of the planetarium projector, when in its open position.

The upper portion 3, therefore, can be retained in an open position, as shown in FIG. 2, wherein the first part 7 of the upper portion is slid into the lower hemispherical portion 1 such that a bottom rim 14 of the second part 9 abuts an upper rim 13 of the lower portion 1. When the upper portion 3 is in its opened position, the interior of the planetarium projector is easily accessible.

Alternatively, the upper portion 3 can be retained in a closed position, as shown in FIG. 1, wherein the first part 7 of the upper portion 3 is not slid into the lower portion 1, such that the two parts 7, 9 form a hemisphere mounted over, and covering, the lower hemispherical portion 1. At this point, a rim 11 of the first part 7 abuts the upper rim 13 of the lower portion 1.

The upper portion 3 has a large aperture 15 through which light can be transmitted from a light source within the planetarium, and images can be subsequently projected on a surface. The lower and upper portions 1, 3 of the planetarium are attached together to form a hollow sphere.

In an alternative embodiment (not shown), the upper portion 3 is formed in first and second parts 7 and 9. The first part 7 is fixedly attached to an inner wall of one side of the lower portion 1 and protrudes upwards therefrom. The second part 9, forming a substantial part of the entire hemispherical upper portion 3, is pivotally mounted on the lower portion 1 so as to slidable over the first part 7.

Figure 4:
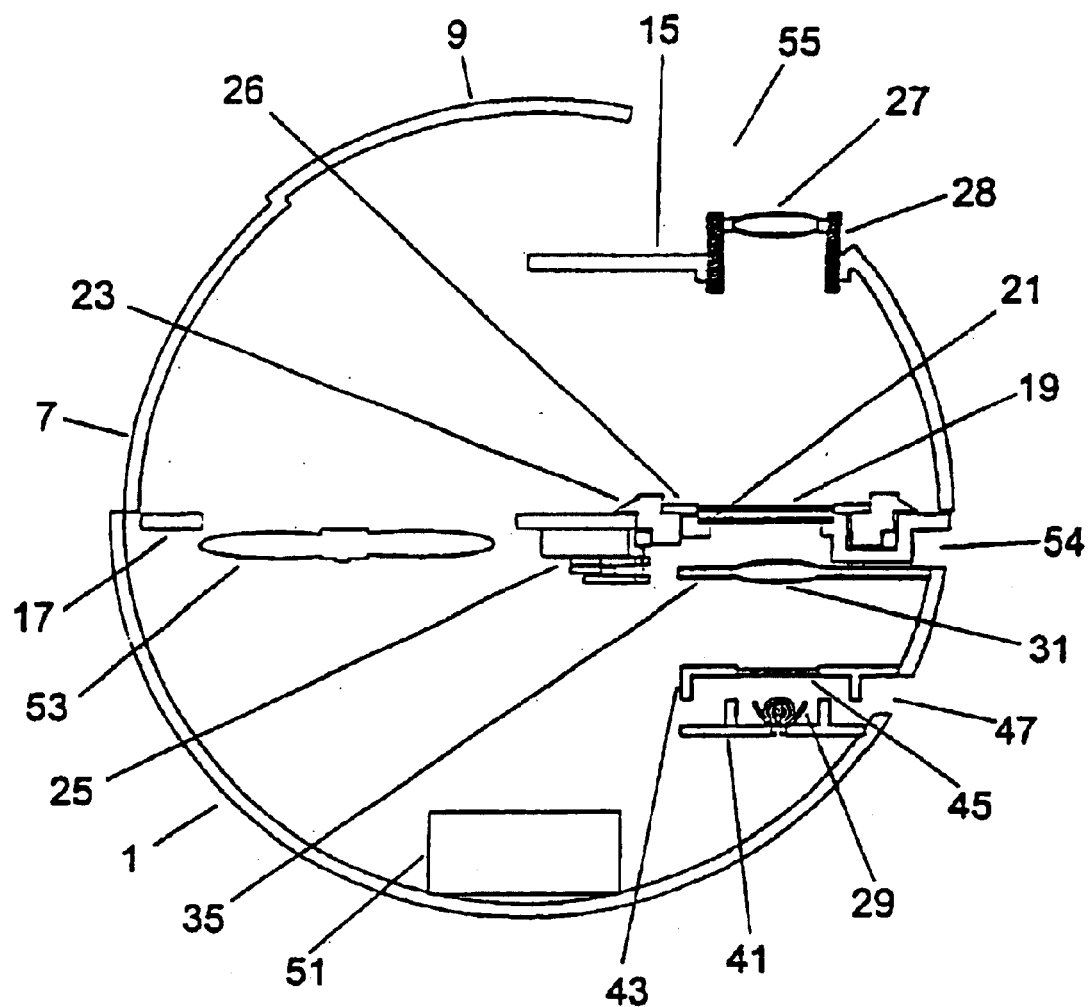
FIG. 4 is a diagrammatic representation showing the internal components of the planetarium projector of FIGS. 1 to 3.

All the components of the projector are located within the hollow sphere. Referring to FIG. 4, a plastic base plate 17, having a diameter substantially equal to that of the lower hemispherical portion 1, is fixedly attached to the top of that portion. Thus, the base plate 17 divides the upper and lower hemispherical portions 1, 3.

Figure 3:
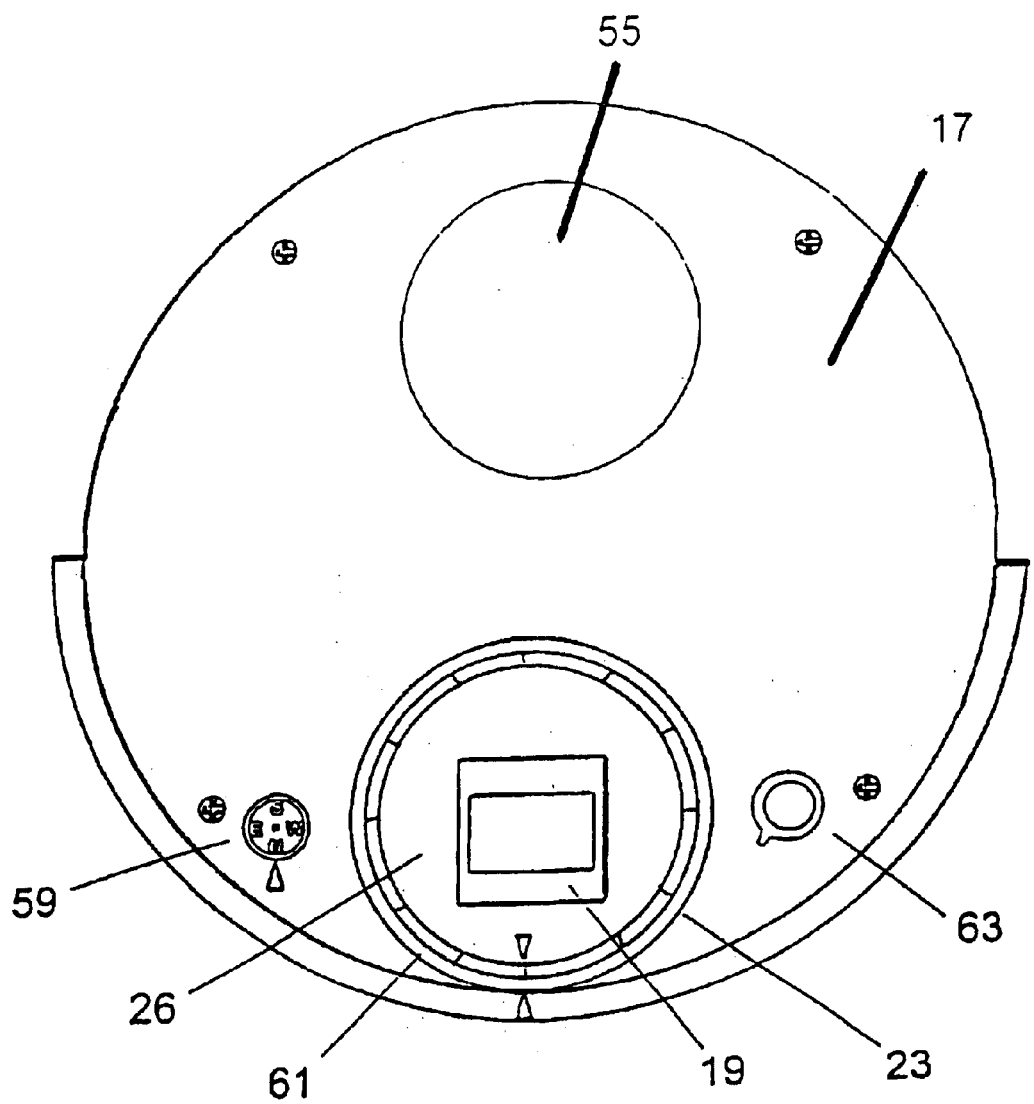
FIG. 3 is cross sectional view taken through A—A of FIG. 1 or 2.

Referring to FIGS. 3 and 4, the base plate 17 has, mounted thereon, means for mounting two vertically juxtaposed transparent slides 19, 21. The mounting means include, a rotatable carousel 23, on which the top slide 19 is positioned. The carousel 23 is driven by an electric motor with gearing 25. The bottom slide 21 rests in an indentation formed in the base plate 17. The bottom slide 21 is not rotatable. The carousel 23 rests on a wider indentation in the base plate 17. A rotatable mounting 26 is located within the carousel 23. The rotatable mounting 26 holds the top slide 19. A wide angle projecting lens 27 is mounted above the top slide 19. With the upper portion 3 retained in its opened position, the projecting lens 27 is swung out of the projection path allowing complete and easy accessibility to the slides 19, 21 and their mountings 23, 26.

The bottom, fixed slide displays an image of the horizon. The top, rotatable slide 19 can be routinely changed and can display, for example, an unannotated night sky or an annotated night sky showing northern or southern hemisphere starfields, planets and other celestial bodies associated therewith or solar systems and celestial bodies associated therewith.

A light source, in the form of a standard low energy halogen reflector bulb 29, is located beneath the bottom slide 21. A condensing lens 31 is located between the bulb 29 and the bottom slide 21 so as to condense and intensify the light emitted to the bottom slide. The condensing lens 31 is fixed to a support plate 35 made of plastics material. The support plate 35 is attached to the base plate 17. The support plate 35 additionally functions as a ventilation baffle to provide thorough ventilation to both the bottom slide 21 and the condensing lens 31. An aperture 54 is provided in the lower hemispherical portion 1, the aperture forming an air inlet to provide air flow underneath the bottom slide 21, so as to keep the bottom slide sufficiently cool.

The light source 29 is fixed to a support plate 41, made of a metallic material which is able to withstand high levels of heat, such as tin, for example. The support plate 41 is coated with non-flammable black paint. A further support plate 43, with a heat filter 45 attached thereto, is provided above the light bulb support plate 41. The support plates 41, 43 are attached to the base plate 17. The heat filter 45 is positioned directly above the light bulb 29 to reduce the intensity of the heat transmitted from the light bulb to the condensing lens 31. An aperture 47 is provided in the lower hemispherical portion 1 between the two support plates 41, 43, and forms an air inlet to provide air flow over the light bulb 29 in order to carry away heat emitted from it. The support plates 41, 43 additionally function as ventilation baffles.

The projecting lens 27 is located within a mount 28 adjustably mounted on the lens plate 15, and protruding upwardly therefrom. The projecting lens 27 is positioned such that images on the transparent slides 19, 21 can be projected onto a display surface (not shown). The exterior of the projecting lens mount 28 has a screw thread which engages with a horizontal aperture in the lens plate 15 attached to the upper hemisphere portion. The projector operator is able to rotate the lens mount 28 to move the lens 27 vertically in order to achieve focusing of the image on the projection surface.

A transformer 51, within the projector sphere, provides low voltage to the light bulb 29, the motor 25 and a fan 53, from a mains supply. The transformer 51 additionally provides ballast weight to keep the hollow sphere stable and upright on the base ring 5. One or more further cooling fans are provided within the planetarium sphere in order to keep the components within the sphere sufficiently cool. An aperture 55 is provided in the surface of the upper portion 3, which allows the warmed air to exit the sphere. The ventilation fan(s) 53 cause sub-atmospheric air pressure to develop in the lower hemispherical portion 1. This, in turn, causes the higher air pressure, formed in the upper hemispherical portion 3, to gently push down on the slide 19. The resultant force firmly seats the slide 19 in its position, and prevents it from moving vertically, thus avoiding the re-focusing operations usually necessary with conventional slide projectors.

Referring back to FIG. 3, the base plate 17 has a ball compass 59 formed integral therewith. This allows the projector to be correctly aligned with magnetic north, such that the projected night sky can accurately reflect the orientation of the stars for the current date and time. The carousel 23 is circular and has, circumventing its perimeter, a time dial 61. In use, the top slide 19 rests in a mount 26 that rotates within the carousel 23, and is initially aligned to the correct date using the time dial 61. The time dial 61 is then aligned, together with the slide mount 26, to the correct time with the aid of an arrow marked on the base plate 17. Once positioned correctly, the top slide 19 rotates together with the carousel 23 at a predetermined speed, set by a carousel speed control 63 formed integrally with the base plate 17. As the top slide 19 rotates, above the fixed bottom slide 21, varying images will be emitted from the slides and on to a planar surface (not shown).

An audio tape, compact disc or the like may also be provided to provide narration as the planetarium is in operation.

Due to the nature of the invention, models of varying complexity can be envisaged for different applications. Two examples of such models are detailed below.

A "Junior" model has been produced, having a reduced number of components resulting in reduced price and function. Such a model may be suitable as a child's toy or for soothing illumination of a ceiling of a room in the home. The images of stars and the like, projected onto a ceiling may also be used as a stencil for correctly placing phosphorescent glow-in-the-dark stars available from toy shops. This model is, preferably, battery powered with a low-wattage lamp. The lenses are preferably made from plastics material. The model does not require a motor or gearing (although the carousel and slide mount will still be rotatable manually) or a ventilation fan.

A "Professional" model has also been constructed which is intended to be used by teachers, and people putting on shows for larger audiences. The control mechanisms of this model are, preferably, operated from buttons exterior to the main planetarium structure by a remote control unit. A relay box in the control unit has a plurality of relays, each being operatively associated with a button to actuate a planetarium mechanism. The carousel 23 also has additional speed settings (for example two minute full rotation) and a switch to rotate the carousel in both directions. Carousel speeds may be selected from the remote control unit. Preferably, this model also has the facility for the operator to remotely change slides. In this case, a plurality of rotatable carousels 23 may be provided on the base plate 17. The base plate 17 may rotate on bearings, thereby bringing each carousel, in turn, into the path of the projected light.

Furthermore, the Professional model, preferably, includes the facility for inaudible ultrasound pulses recorded in an audio program designed to run concurrently with the planetarium to automatically operate the controls of the planetarium.

Although the specific description relates to a planetarium projector, it is clearly envisaged that the invention can be incorporated into any slide projector presentation to show, for example, movements of various items in relation to a fixed horizon or background.

What is claimed is:

1. A slide projector comprising projection means for directly projecting an image from a slide perpendicularly onto a projection surface, the projection means being such that the projected image of the slide lies, in use, in a substantially planar projection surface, the projection means comprising:
   a light source;
   at least two vertically juxtaposed slides parallel to each other;
   rotation means to rotate at least one of the slides; and
   means to provide and air flow to thereby provide a negative pressure below said slides to retain the slides in their respective positions.

2. A slide projector according to claim 1, wherein the image is projected vertically from at least one of said slides onto a substantially planar projection surface.

3. A slide projector according to claim 1, wherein the at least two slides are in a horizontal plane.

4. A slide projector according to claim 1, wherein the projection means further comprises mounting means for holding at least one of the slides in a fixed position.

5. A slide projector according to claim 4, wherein the fixed slide is positioned directly below a rotatable slide.

6. A slide projector according to claim 5, wherein the projection means further comprises means for retaining the slides on a carousel and the mounting means respectively, and for keeping the slides in close contact therewith.

7. A slide projector according to claim 6, wherein the retaining means further comprises means for providing of an air flow above and below the slides.

8. A planetarium having a slide projector constructed in accordance with claim 1.

9. A planetarium having a slide projector constructed in accordance with claim 4.

10. A planetarium according to claim 9, wherein the fixed slide is such as to display, in use, an image of a night horizon.

11. A planetarium according to claim 8, wherein the projector means comprises rotation means for rotating at least one of the slides.

12. A planetarium according to claim 11, wherein the rotatable slide is such as to display, in use, an image of a starfield.

13. A planetarium according to claim 8, wherein the rotatable slide is such as to display, in use, an image of a planet and any celestial bodies associated therewith.

14. A planetarium according to claim 8, wherein the rotatable slide is such as to display, in use, an image of a solar system and any celestial bodies associated therewith.

15. A slide projector comprising projection means for directly projecting an image from a slide perpendicularly onto a projection surface, the projection means being such that the projected image of the slide lies, in use, in a substantially planar projection surface, the projection means comprising:
   a light source;
   at least two vertically juxtaposed slides parallel to each other;
   rotation means to rotate at least one of the slides, the rotation means is in the form of a rotatable carousel; and
   a projecting lens movable between a first position, directly above the at least two slides, and a second position away from the first position, thereby to allow easy access to the slides.

16. A slide projector according to claim 15, wherein the rotatable carousel is able to rotate at least one of said slides at a predetermined speed.

* * * * *